(12) United States Patent
Mifune

(10) Patent No.: US 10,514,575 B2
(45) Date of Patent: Dec. 24, 2019

(54) ILLUMINATION DEVICE FOR USE IN LOCAL DIMMING

(71) Applicant: Japan Display Inc., Minato-ku (JP)

(72) Inventor: Masayuki Mifune, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 16/242,166

(22) Filed: Jan. 8, 2019

(65) Prior Publication Data

US 2019/0137824 A1    May 9, 2019

Related U.S. Application Data

(63) Continuation of application No. 15/881,917, filed on Jan. 29, 2018, now Pat. No. 10,216,036.

(30) Foreign Application Priority Data

Jan. 31, 2017  (JP) ................. 2017-015809

(51) Int. Cl.
| | | |
|---|---|---|
| *G02F 1/1335* | (2006.01) | |
| *G02F 1/1339* | (2006.01) | |
| *G02B 27/01* | (2006.01) | |
| *G02B 19/00* | (2006.01) | |

(52) U.S. Cl.
CPC ... *G02F 1/133605* (2013.01); *G02B 19/0019* (2013.01); *G02B 19/0066* (2013.01); *G02B 27/0101* (2013.01); *G02F 1/133603* (2013.01); *G02F 1/133606* (2013.01)

(58) Field of Classification Search
CPC ......... G02F 1/133605; G02F 1/133606; G02F 1/133603; G02B 27/0101
See application file for complete search history.

(56) References Cited

U.S. PATENT DOCUMENTS

| | | | |
|---|---|---|---|
| 9,632,357 B2* | 4/2017 | Park ................ | G02F 1/133608 |
| 2007/0070625 A1* | 3/2007 | Bang ................ | G02F 1/133603 |
| | | | 362/240 |
| 2018/0206298 A1* | 7/2018 | Chen ................ | H01L 27/32 |

FOREIGN PATENT DOCUMENTS

JP    2008-68766    3/2008

\* cited by examiner

*Primary Examiner* — Tracie Y Green
(74) *Attorney, Agent, or Firm* — Oblon, McClelland, Maier & Neustadt, L.L.P.

(57) ABSTRACT

According to one embodiment, an illumination device includes a light source module, and a reflector opposed to the light source module. The reflector includes a plurality of incidence openings on which light from the light source module is made incident, a plurality of emission openings opposed to the incidence openings, a plurality of reflective surfaces extending from the incidence openings to the emission openings, respectively, and reflective films formed on the reflective surfaces. The reflector includes a plurality of blocks, and the blocks are bonded to each other to form the reflector.

20 Claims, 14 Drawing Sheets

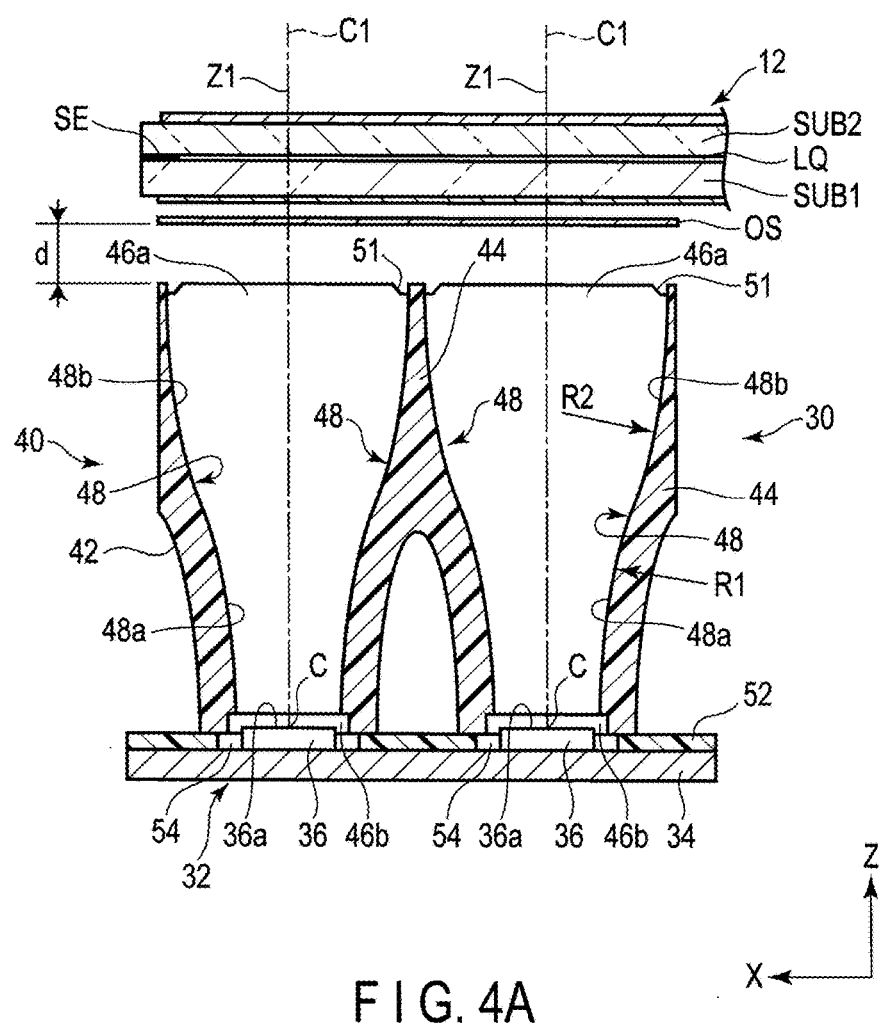
F I G. 4A

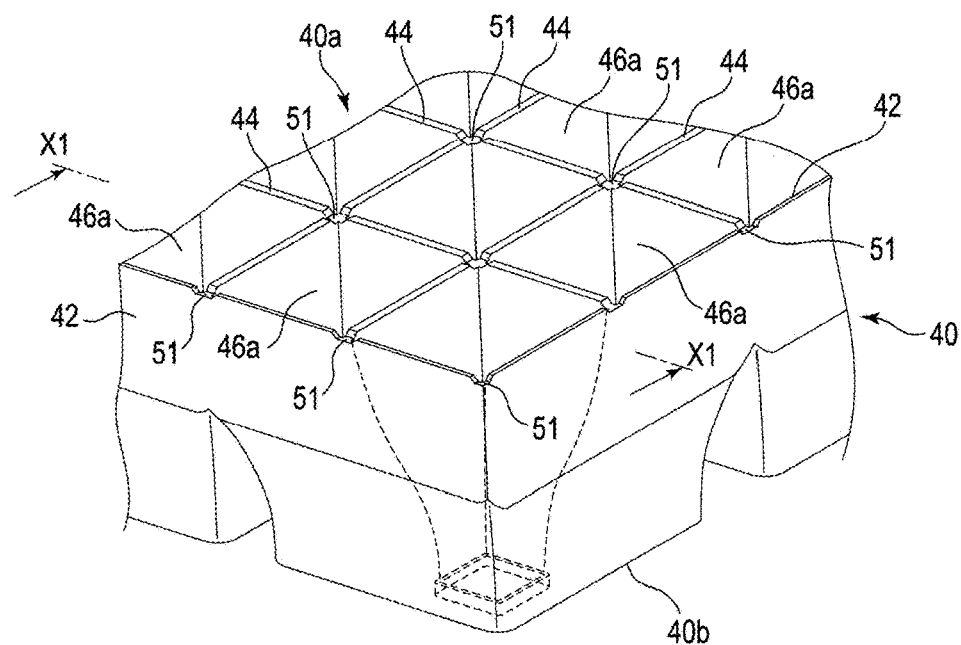
F I G. 5
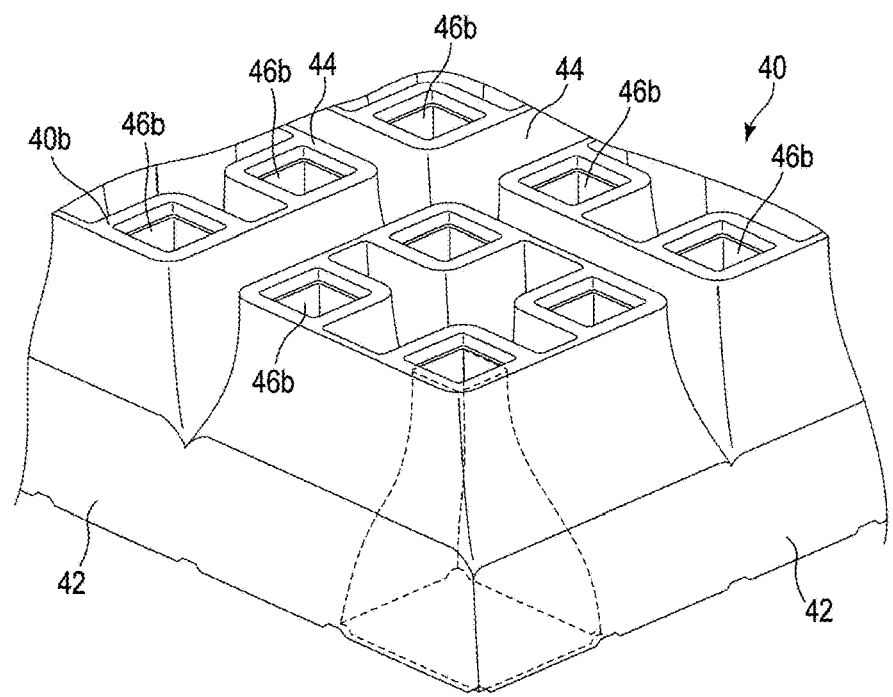
F I G. 6

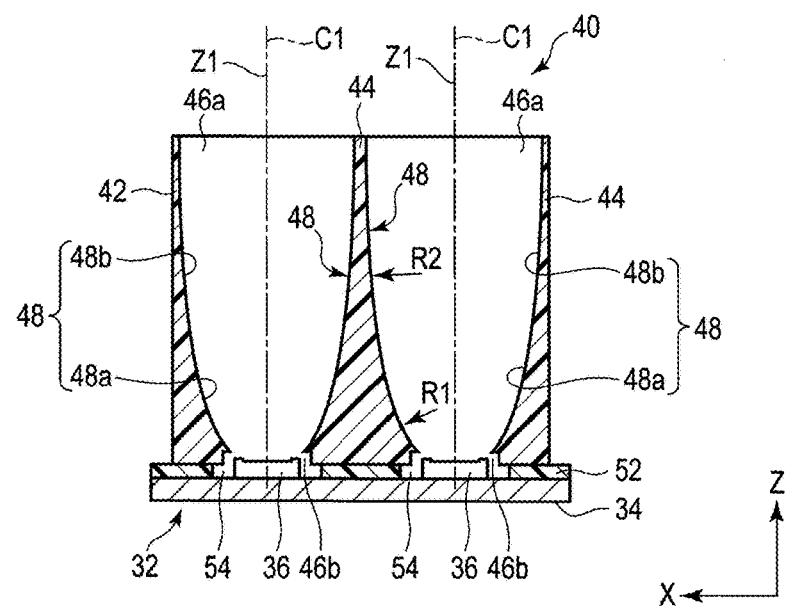
F I G. 11
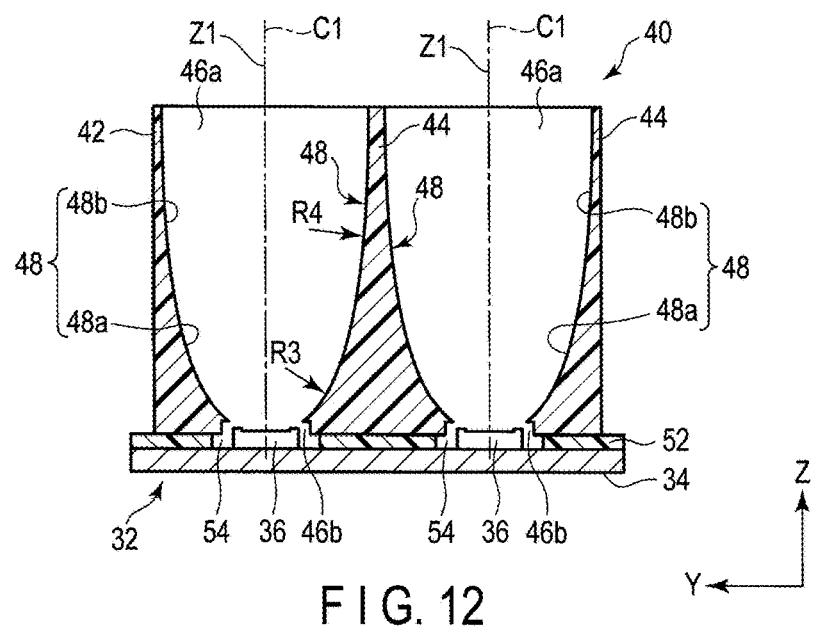
F I G. 12

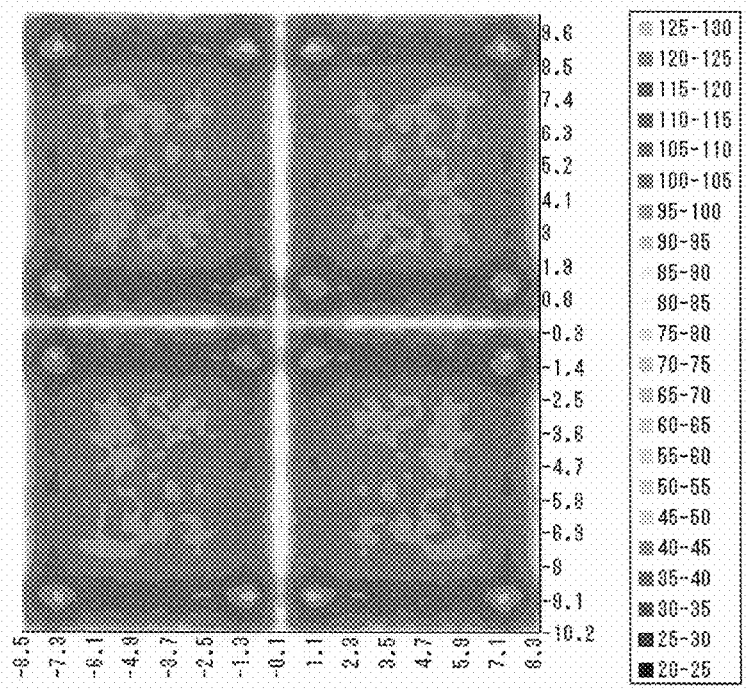
F I G. 17
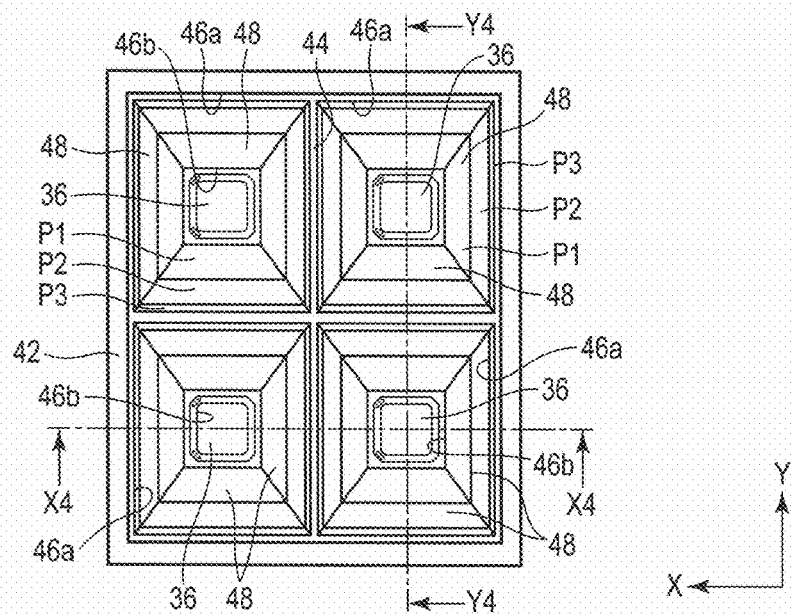
F I G. 18

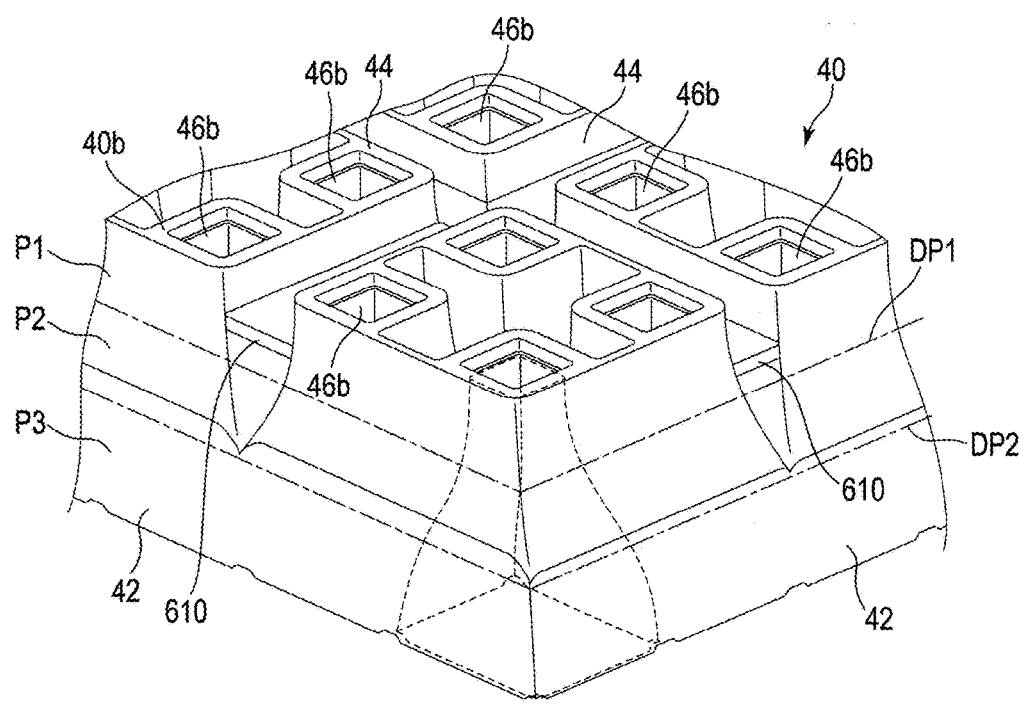
F I G. 21

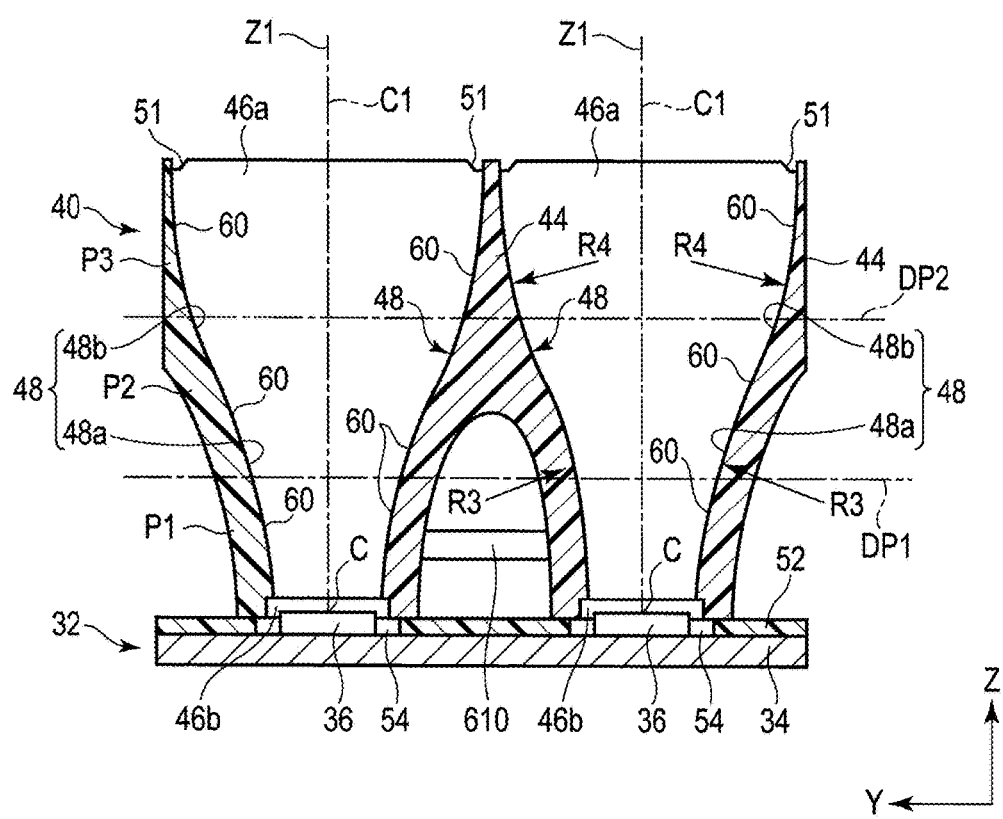
F I G. 22

ILLUMINATION DEVICE FOR USE IN LOCAL DIMMING

CROSS-REFERENCE TO RELATED APPLICATIONS

This application is a continuation of U.S. application Ser. No. 15/881,917 filed Jan. 29, 2018, and is based upon and claims the benefit of priority from Japanese Patent Application No. 2017-015809, filed Jan. 31, 2017, the entire contents of each of which are incorporated herein by reference.

FIELD

Embodiments described herein relate generally to an illumination device and, more particularly, to an illumination device for use in local dimming.

BACKGROUND

In recent years, head-up displays (HUDs) reflecting images on windshields or the like to display information into drivers' field of view have been prevalent. The HUD reproduces a virtual image at a location approximately 4 m ahead of the windshield, enables the driver to confirm route guidance, emergency information, and the like without largely changing the line of sight, and contributes to safety.

In general, the HUD comprises a liquid crystal panel and an illumination device called a backlight which applies light to the liquid crystal panel. An image formed on the liquid crystal panel is transmitted by the light of the backlight and projected to the windshield. The image is reflected on the windshield, and a virtual image is thereby formed.

In the HUD, the backlight comprises a light source and a reflector which reflects a part or all parts of the light beam emitted from the light source to the liquid crystal panel. Increasing the directivity of the light emitted from the reflector in the backlight is a measure effective for increase in the brightness, reduction in the power consumption, and reduction in the heat generation. This directivity increases as the reflector becomes higher (i.e., as the distance of passage of light becomes longer). If the reflective surface of the reflector has a low reflectance, however, the light is lost and the brightness of the backlight becomes lower as the light is reflected on the reflective surface.

BRIEF DESCRIPTION OF THE DRAWINGS

FIG. 4A is a cross-sectional view of the liquid crystal display device taken along line X1-X1 in FIG. 2.

FIG. 5 is a perspective view showing an emission surface side of the reflector of the liquid crystal display device.

FIG. 6 is a perspective view showing an incidence surface side of the reflector.

FIG. 11 is a cross-sectional view of the reflector and the light source unit taken along line X2-X2 in FIG. 10.

FIG. 12 is a cross-sectional view of the reflector and the light source unit taken along line Y2-Y2 in FIG. 10.

FIG. 17 is a graph showing an example of an emitted light profile of a reflector according to the third embodiment.

FIG. 18 is a plan view showing a reflector and a light source unit in a display device according to a fourth embodiment.

FIG. 21 is a perspective view showing an incidence surface side of a reflector according to the other structural example.

FIG. 22 is a cross-sectional view of a reflector according to the other structural example.

DETAILED DESCRIPTION

Various embodiments will be described hereinafter with reference to the accompanying drawings. In general, according to one embodiment, an illumination device comprises a light source module, and a reflector opposed to the light source module. The reflector comprises a plurality of incidence openings on which light from the light source module is made incident, a plurality of emission openings opposed to the incidence openings, a plurality of reflective surfaces extending from the incidence openings to the emission openings, respectively, and reflective films formed on the reflective surfaces. The reflector comprises a plurality of blocks, and the blocks are bonded to each other to form the reflector.

The disclosure is merely an example, and proper changes in keeping with the spirit of the invention, which are easily conceivable by a person of ordinary skill in the art, come within the scope of the invention as a matter of course. To more clarify the explanations, the drawings may pictorially show width, thickness, shape, etc., of each portion as compared with an actual aspect, but they are mere examples and do not restrict the interpretation of the invention. In the present specification and drawings, elements like or similar to those in the already described drawings may be denoted by similar reference numbers and their detailed descriptions may be arbitrarily omitted.

First Embodiment

Figure 1:
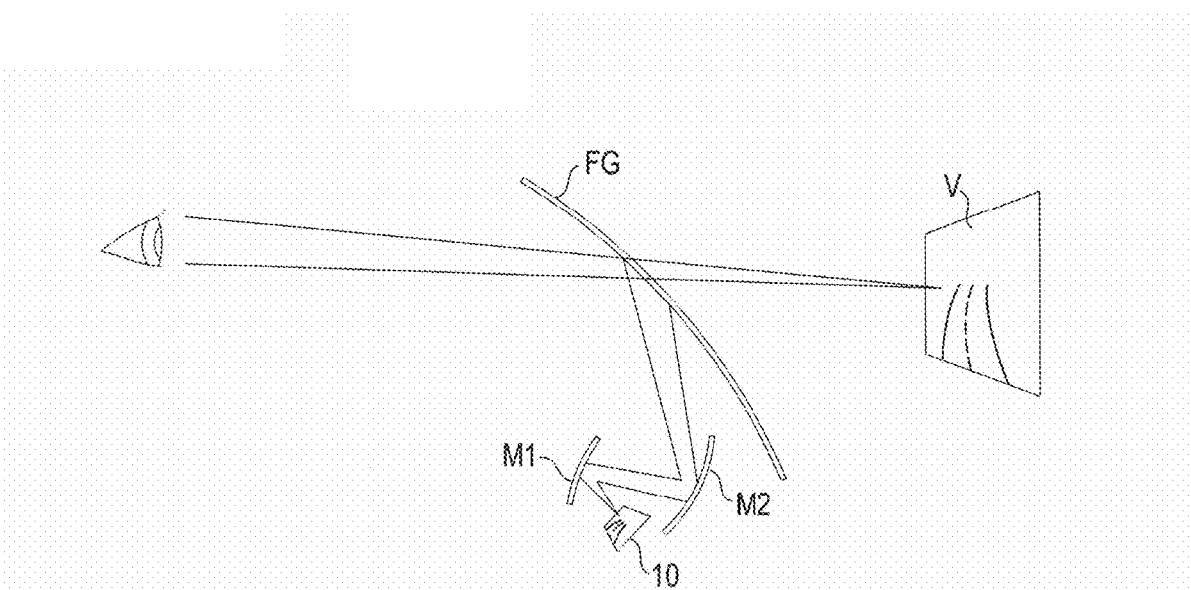
FIG. 1 is an illustration schematically showing a head-up display using a liquid crystal display device according to a first embodiment.

FIG. 1 is an illustration schematically showing a head-up display (HUD) using a liquid crystal display device according to the First Embodiment. The HUD comprises a liquid crystal display device 10 as a display device which projects an image. The HUD comprises a plurality of, for example, two concave mirrors M1 and M2. The projected image output from the liquid crystal display device 10 is reflected and condensed by the concave mirrors M1 and M2 and projected to an inner surface of a windshield FG of an automobile. The projected image is reflected to a driver side by the windshield FG and forms a virtual image V several meters ahead of the windshield FG.

As the mirrors constituting a projection unit, the concave mirrors are not limited but the other optical members such as half mirrors and Fresnel mirrors can be selected. In addition, the image does not need to be directly projected to the windshield FG, but a transparent reflector plate may be provided in front of the driver and the image may be projected to the reflector plate.

Figure 2:
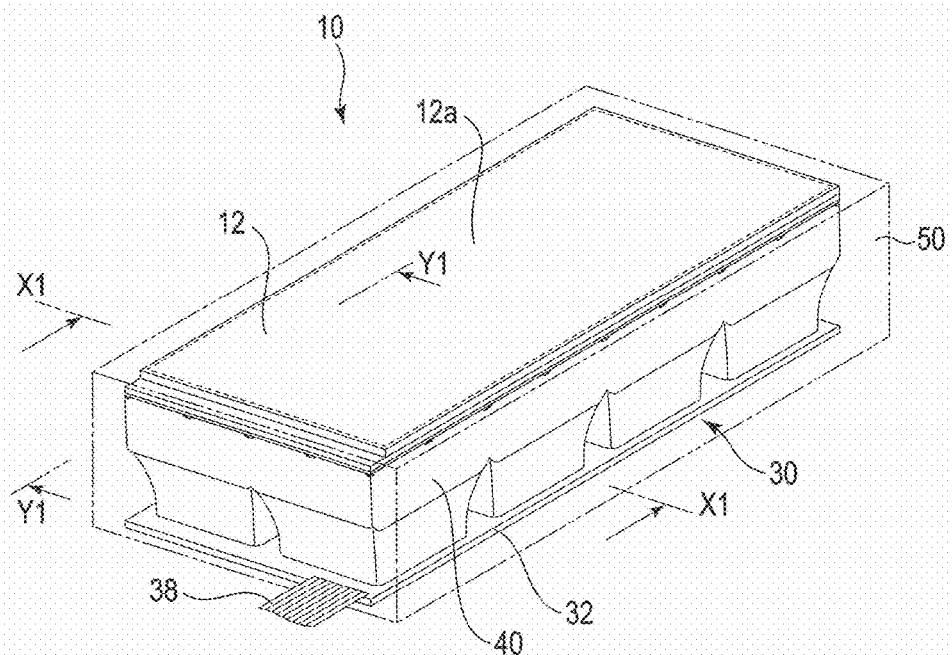
FIG. 2 is a perspective view showing the liquid crystal display device.

Next the liquid crystal display device 10 will be explained in detail. FIG. 2 is a perspective view showing the liquid crystal display device, and FIG. 3 is an exploded perspective view of the liquid crystal display device.

Figure 3:
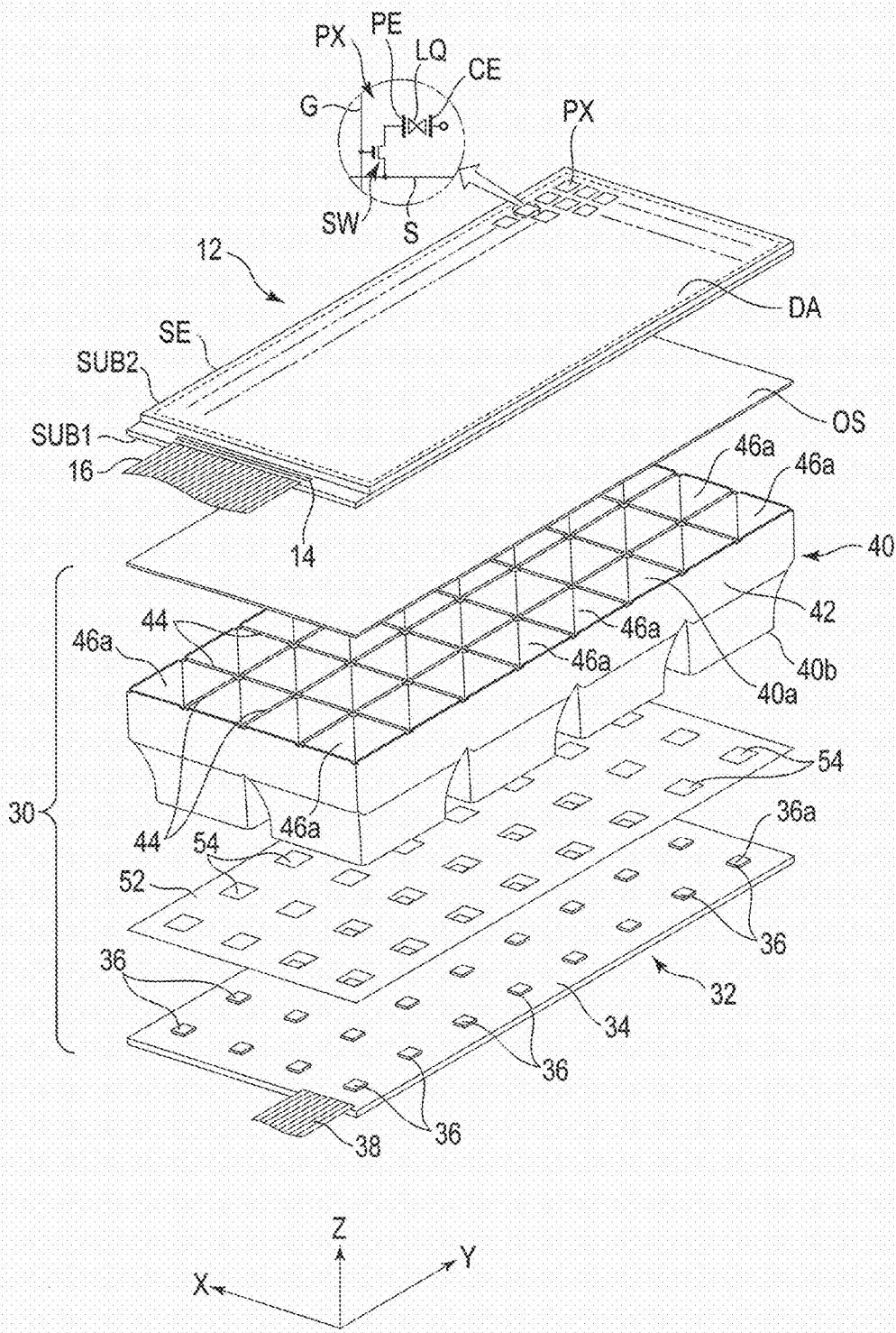
FIG. 3 is an exploded perspective view showing the liquid crystal display device.

As shown in FIG. 2 and FIG. 3, the liquid crystal display device 10 comprises an active-matrix liquid crystal display panel 12, an illumination device (backlight device) 30 opposed to the rear surface of the liquid crystal display panel 12, and an outer casing 50 which accommodates the liquid crystal display panel 12 and the backlight device 30 in a state in which a display surface 12a of the liquid crystal display panel 12 is exposed. The backlight device 30 illuminates the liquid crystal display panel 12 by applying a light beam from a rear surface side.

The liquid crystal display panel 12 comprises a first substrate SUB1 shaped in a rectangular plate, a second substrate SUB2 shaped in a rectangular plate and opposed to the first substrate SUB1, and a liquid crystal layer LQ held between the first substrate SUB1 and the second substrate SUB2. Each of the first substrate SUB1 and the second substrate SUB2 is formed of, for example, an insulating substrate such as a glass substrate. The first substrate SUB1 and the second substrate SUB2 are attached to each other by a frame-shaped sealing member SE while a predetermined cell gap is formed between the substrates. The liquid crystal layer LQ is held on an inner side surrounded by the sealing member SE, in the cell gap.

A display area (active area) DA for displaying the image is provided in an area on the inner side of the sealing member SE in planar view. The liquid crystal display panel 12 comprises a plurality of pixels PX arrayed in a matrix, in the display area DA. As schematically shown in FIG. 3, the first substrate SUB1 comprises, in the display area DA, gate lines G extending in the first direction, source lines S extending in the second direction, switching elements SW electrically connected with the gate lines G and the source lines S in the respective pixels PX, pixel electrodes PE connected to the switching elements SW in the respective pixels PX, and the like. A common electrode CE of a common potential is disposed on the first substrate SUB1 or the second substrate SUB2 and opposed to the pixel electrodes PE. The gate lines G may not be formed in a straight line parallel to the first direction, and the source lines S may not be formed in a straight line parallel to the second direction.

In the example illustrated, a short side end portion of the first substrate SUB1 protrudes more outwardly than a short side of the second substrate SUB2, and a driver IC 14 is mounted on the end portion as a driver element. A flexible printed circuit board (FPC) 16 is bonded to the end portion of the first substrate SUB1 and extends outwardly from the liquid crystal display panel 12. The FPC 16 is connected to the driver IC 14 via lines on the first substrate SUB1. The driver IC 14 supplies drive signals to the pixels PX, based on a video signal and scan signal supplied from a controller (not shown) via the FPC 16.

The liquid crystal display panel 12 comprises a transmissive display function of displaying an image by selectively urging the light from the backlight device 30 to be transmitted through the display area DA. The liquid crystal display panel 12 may be configured to correspond to a lateral electric field mode primarily using an electric field approximately parallel to main surfaces of the substrates or a vertical electric field mode primarily using an electric field approximately perpendicular to the main surfaces of the substrates.

Next, a structural example of the backlight device 30 will be explained in detail. As shown in FIG. 2 and FIG. 3, the backlight device 30 comprises a light source unit (light source module) 32 comprising a plurality of light sources, a reflector 40 provided between the light source unit 32 and the liquid crystal display panel 12, and an optical sheet, for example, a diffusion sheet OS, provided between the liquid crystal display panel 12 and the reflector 40. The reflector 40 projects light emitted from the light source unit 32 to the liquid crystal display panel 12 with directivity while reflecting the light beam. In the drawings, the longitudinal direction of the liquid crystal display panel 12 and the backlight device 30 is referred to as an X-axis direction, the width direction of the liquid crystal display panel 12 and the backlight device 30 is referred to as a Y-axis direction, and the height direction of the liquid crystal display panel 12 and the backlight device 30 is referred to as a Z-axis direction.

Figure 4B:
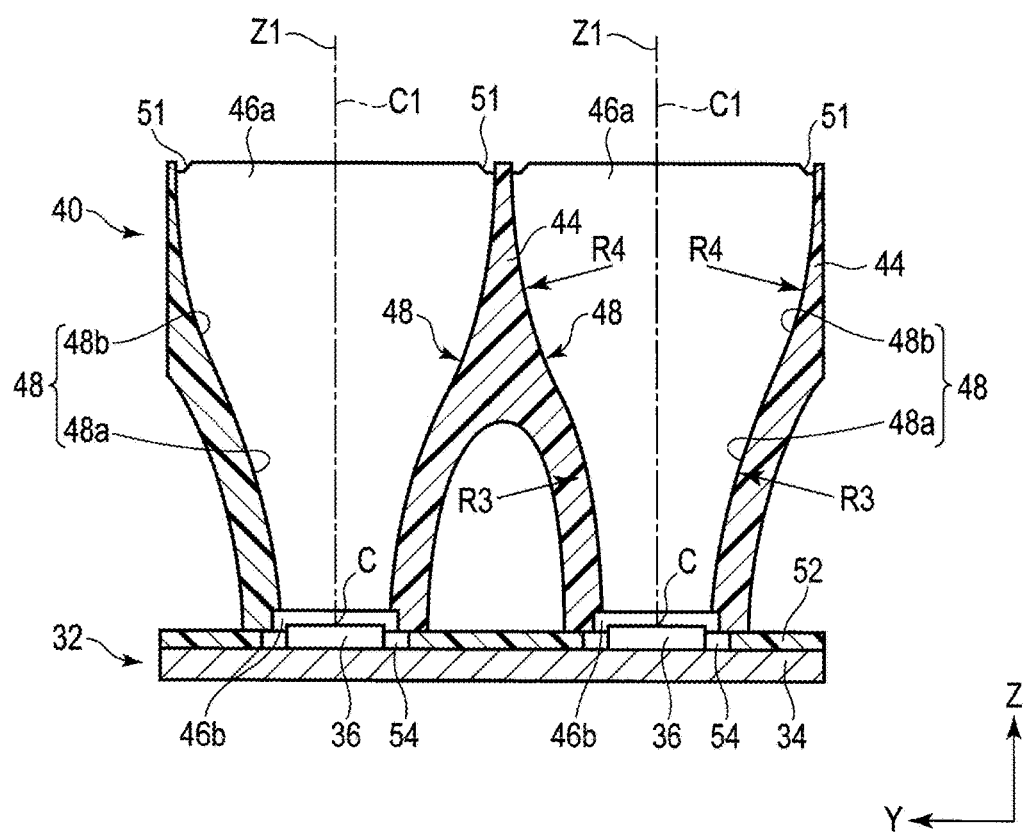
FIG. 4B is a cross-sectional view of a reflector and a light source unit taken along line Y1-Y1 in FIG. 2.

FIG. 4A is a cross-sectional view showing several parts of the backlight device 30 taken along line X1-X1 in FIG. 2, and FIG. 4B is a cross-sectional view of the reflector and the light source unit taken along line Y1-Y1 in FIG. 2. As shown in FIG. 3 and FIG. 4A, the light source unit 32 comprises a rectangular circuit board 34, and a plurality of light-emitting diodes (LEDs) 36 serving as light sources mounted on the circuit board 34. The circuit board 34 is formed in substantially the same dimensions (length and width) as the liquid crystal display panel 12. For example, thirty-two LEDs 36 are mounted on the circuit board 34 and arrayed in a matrix in four longitudinal columns and eight lateral rows. Each LED 36 can be formed in various shapes such as a circular shape, a rectangular shape, and an elliptic shape. For example, each LED 36 is formed in a rectangular shape. An upper surface of each LED 36 constitutes a light-emitting surface 36a and includes a center C of light emission in the center of the light-emitting surface 36a. The LEDs 36 are disposed such that a side of each LED is aligned with a side of the other LED. The number and alignment of the LEDs 36 are not limited to the above-explained example, but can be variously changed in accordance with the dimensions and size of the liquid crystal display panel 12.

The circuit board 34 is connected to a controller (not shown) via a flexible printed circuit board (FPC) 38. The LEDs 36 are driven to illuminate independently by the controller. In other words, the LEDs 36 can be urged to illuminate together simultaneously or several LEDs can be urged to partially illuminate in accordance with the displayed image by local dimming drive.

FIG. 5 is a perspective view showing an emission surface side of the reflector, and FIG. 6 is a perspective view showing several parts of an incidence surface side of the reflector.

As shown in FIG. 3 to FIG. 6, the reflector 40 comprises an outer wall 42 shaped in a rectangular frame having an approximately equal size as the liquid crystal display panel 12 and a plurality of partition walls (side walls) 44 arranged to cross the inner side of the outer wall 42 in a grating shape. The reflector 40 is integrally formed of, for example, white synthetic resin (for example, polyethylene terephthalate). The reflector 40 includes an upper surface serving as an emission surface 40a and a bottom surface serving as an incidence surface 40b. The emission surface 40a forms a rectangular shape of an approximately equal size as the liquid crystal display panel 12.

A plurality of emission openings 46a defined by the outer wall 42 and a plurality of side walls 44 open to the emission surface 40a. For example, each of the emission openings 46a has a rectangular shape or a square shape having four sides. The emission openings 46a are arranged adjacent to the longitudinal direction (X-axis direction) and the width direction (Y-axis direction) of emission surface 40a. In the present embodiment, thirty-two emission openings 46a are provided in accordance with the number of the LEDs 36, and arranged in four longitudinal columns and eight lateral rows.

A plurality of incidence openings 46b defined by the outer wall 42 and the side walls 44 open to the incidence surface 40b. Each of the incidence openings 46b is formed in a rectangular shape or a square shape having four sides. Thirty-two emission openings 46a are provided in accordance with the number of the LEDs 36, and arranged in four longitudinal columns and eight lateral rows. Each of the incidence openings 46b is formed in a size sufficiently smaller than the emission opening 46a, for example, half a size or smaller than half a size of the emission opening 46a. The incidence openings 46b are provided at positions of the same axes as the corresponding emission openings 46a, respectively.

The reflector 40 includes a plurality of reflective surfaces 48 formed by inner surfaces of the side walls 44 and the inner surfaces of the outer wall 42. In other words, four reflective surfaces 48 are formed for each of the emission openings 46a. Each of the reflective surfaces 48 extends from a side of the incidence opening 46b to a side of the emission opening 46a. Each of the reflective surfaces 48 is formed of a surface obtained by combining a plurality of curved surfaces. In the present embodiment, each of the reflective surfaces 48 includes a first curved surface 48a extending from a side of the incidence opening 46b to a middle part of the height direction of the reflector 40, and a second curved surface 48b extending from the middle part to a side of the emission opening 46a. The first curved surface 48a is, for example, a curved surface which is convex to a central axis Z1 passing through the center of the emission opening 46a or an optical axis C1 of the LED 36, and the second curved surface 48b is a curved surface which is concave to the central axis Z1 or the optical axis C1.

The curved surfaces used in the present embodiment are curved surfaces including a straight central axis parallel to the emission surface 40a of the reflector or the liquid crystal display panel 12 and do not include a spherical surface.

As shown in FIG. 4A and FIG. 4B, two reflective surfaces 48 opposed to each other in the X-axis direction and two reflective surfaces 48 opposed to each other in the Y-axis direction have different curvatures of the curved surfaces, in the present embodiment. For example, on two reflective surfaces 48 opposed to each other in the X-axis direction, the first curved surface 48a and the second curved surface 48b have radius of curvature R1 and radius of curvature R2, respectively, and R1 is larger than or equal to R2 (R1≥R2).

On two reflective surfaces 48 opposed to each other in the Y-axis direction, the first curved surface 48a and the second curved surface 48b have radius of curvature R3 and radius of curvature R4, respectively, R3 is larger than or equal to R4, and R3 is larger than or equal to R1 (R3≥R4, R3≥R1).

Each of the radii of curvature R1 to R4 of the first curved surfaces 48a and the second curved surfaces 48b is arbitrarily set in consideration of the reflection efficiency. For example, the radii of curvature of the first curved surfaces 48a and the second curved surfaces 48b are selected such that the light emitted from the LEDs 36 is reflected to the liquid crystal display panel 12 side with a strong directivity and that the light is emitted uniformly from the overall emission openings 46a.

As shown in FIG. 4A, FIG. 4B, and FIG. 5, four corner portions of each of the emission openings 46a are cut in a predetermined depth to form recess portions 51, at side end portions of the emission surface 40a of the outer wall 42 and the side walls 44 of the reflector 40. By providing the recess portions 51, interference of light can be suppressed at the corner portions of the emission openings 46a and degradation of the luminance at the corner portions can be prevented.

As shown in FIG. 3 and FIG. 4A, the reflector 40 is placed on the circuit board 34 via an elastic sheet or a cushion sheet 52. The cushion sheet 52 formed of an elastic material is formed in a rectangular shape of a size approximately equal to the size of the circuit board 34. A plurality of through holes 54 accommodating the LEDs 36 are formed in the cushion sheet 52. Each of the through holes 54 is formed in a rectangular shape larger than the LED 36.

The incidence surface 40b of the reflector 40 is placed on the cushion sheet 52. The reflector 40 is placed on the cushion sheet 52 such that central axis Z1 of each emission openings 46a is located concentrically with the optical axis C1 of the LED 36. The LED 36 is thereby located in an incidence opening 46b of the reflector 40.

Distortion of the circuit board 34 or the reflector 40 can be absorbed and the reflector 40 can be held at an appropriate position to the circuit board 34 and the LEDs 36, by the elastic deformation of the elastic sheet or the cushion sheet 52. In addition, heat of the LEDs 36 and the circuit board 34 can be transferred and heat can be radiated from the reflector 40 by the elastic sheet or the cushion sheet 52.

Light traveling to the circuit board 34 or a gap between the circuit boar 34 and the reflector 40 can be urged to travel to the reflector 40, and the light emitted from the LEDs 36 can be made incident on the inside of the reflector 40 with a good efficiency, by assigning a high reflectance to the surface or the constituent members of the cushion sheet 52. In addition, light leakage from the circuit board 34 or the gap between the circuit boar 34 and the reflector 40 can be reduced by assigning a low reflectance to the surface or the constituent members of the cushion sheet 52.

As shown in FIG. 2, FIG. 3, and FIG. 4A, the emission surface 40a of the reflector 40 is opposed to the rear surface of the liquid crystal display panel 12 through a predetermined gap. A diffusion sheet OS is located between the emission surface 40a and the liquid crystal display panel 12. The diffusion sheet OS is opposed to the emission surface 40a of the reflector 40 with a gap d (for example, 2 mm).

According to the liquid crystal display device 10 configured as explained above, a part of the light emitted from the LEDs 36 is directly passed through the emission openings 46a of the reflector 40 and is made incident on the diffusion sheet OS. In addition, the other part of the light is reflected on the reflective surfaces 48 of the reflector 40 and is made incident on the diffusion sheet OS through the emission openings 46a. Thus, the light emitted from the LEDs 36 is made incident on the diffusion sheet OS from the emission openings 46a of the reflector 40 with the directivity and is further projected to the liquid crystal display panel 12 through the diffusion sheet OS.

Figure 7:
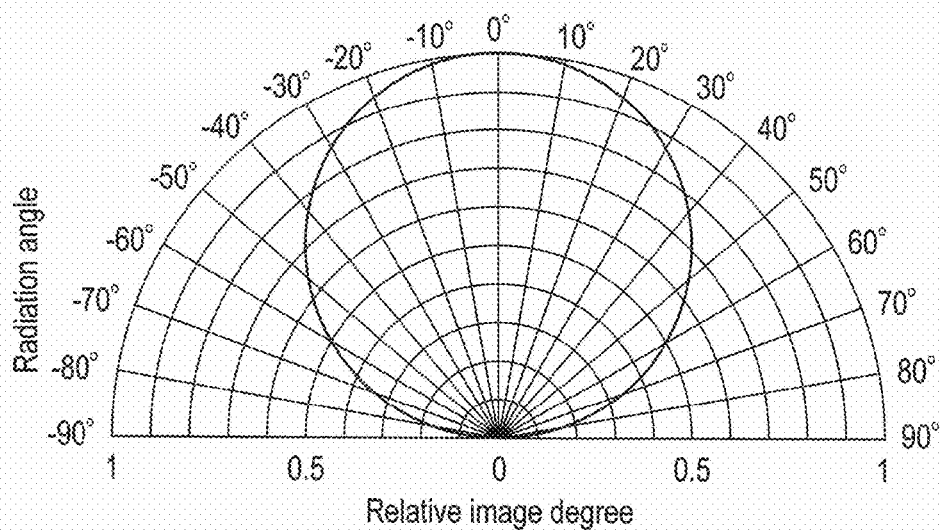
FIG. 7 is a graph showing an orientation characteristic of a light source (LED).
Figure 8:
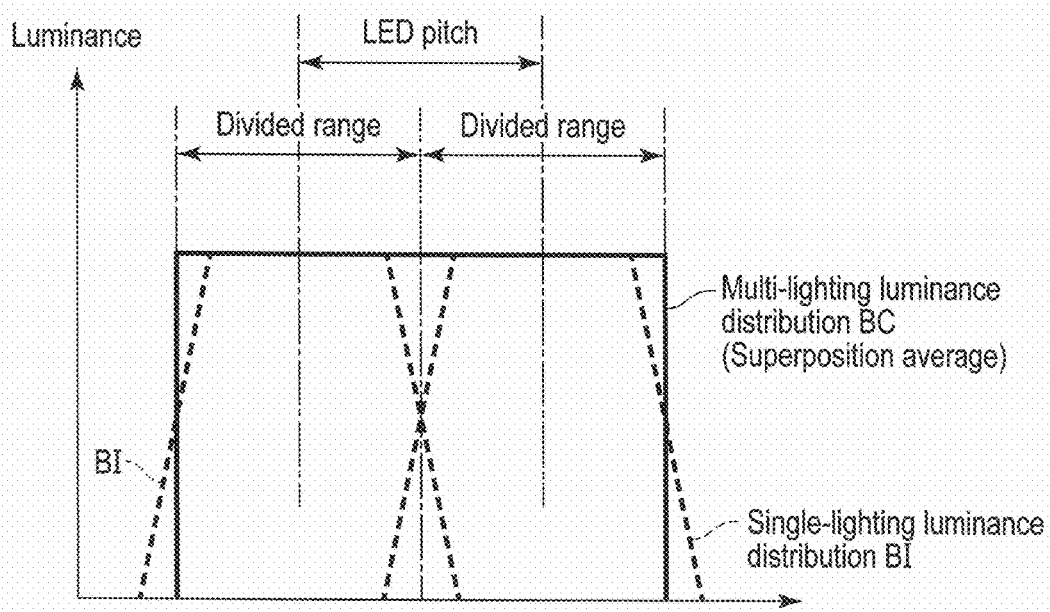
FIG. 8 is a graph showing a luminance distribution of the reflector.

FIG. 7 is a graph showing a target luminance profile of the LED 36. If these LEDs 36 and the reflector 40 are combined, multi-lighting luminance distribution BC uniform over the whole area can be obtained by combining a plurality of single-lighting luminance distributions BI of the light emitted from each of the emission openings 46a, adjacent to each other, as shown in FIG. 8.

Figure 9:
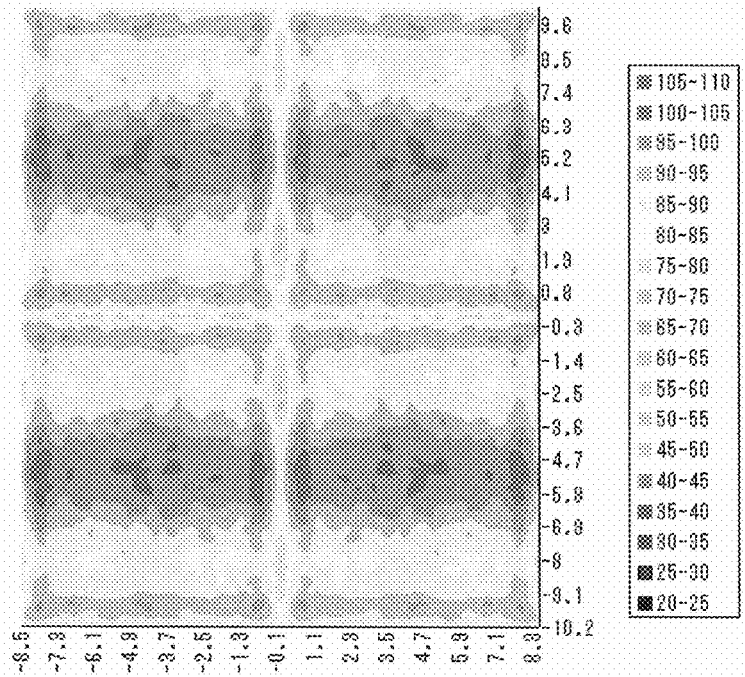
FIG. 9 is a graph showing an example of an emitted light profile of the reflector.

According to the present embodiment, Lambertian emission emitted from the LEDs 36 which are point sources can be converted into emission profiles in square pyramid shape, by constituting the reflective surfaces 48 connected to each of the emission openings 46a by combination of the first curved surfaces 48a and the second curved surfaces 48b different in radius of curvature and, furthermore, in the present embodiment, by providing four reflective surfaces 48 connected to four sides of the rectangular emission opening 46a. FIG. 9 shows an example of an emitted light profile of the reflector 40.

In addition, reduction in the power consumption of the liquid crystal display device 10 can be attempted by 2D local dimming drive (area division drive) of the LEDs 36 of the backlight device 30. In the local dimming drive, each of the LEDs 36 is controlled to illuminate by using the reflector 40 divided for each of the LEDs 36 by the outer wall 42 and the side walls 44, and the light can be thereby applied to the desired divisional areas alone of the liquid crystal display panel 12, i.e., the light can be applied to the only areas where an image is to be displayed, and a sharp image can be displayed. Simultaneously, reduction in the heat generation of the light source unit 32 can be attempted. Since illumination/non-illumination areas are separated by the side walls 44 (reflective surfaces 48) of the reflector 40, high-contrast 2D local dimming drive is executed.

According to the present embodiment, as described above, the illumination device and the display device capable of improving the efficiency with a high directivity can be obtained.

In the first embodiment, the reflective surface of the reflector 40 is not limited to be formed by two curved surfaces, but may be formed of a combination of three or more curved surfaces. The shape of the emission openings is not limited to a rectangle, but may be a triangle or a polygon having five or more angles. The reflective surfaces connected to the emission opening are not limited to four surfaces, but can be three surfaces or five or more surfaces. Furthermore, a vapor-deposited metal film may be formed on the reflective surface for the purpose of increasing the reflectance. The reflector 40 does not need to be formed of synthetic resin but may be formed of a metallic material.

Next, a reflector of a display device according to other embodiments will be explained. In the other embodiments to be explained below, parts identical to the aforementioned first embodiment are denoted by reference symbols identical to the first embodiment, and a detailed description of the parts is omitted or simplified, and parts different from the first embodiment will mainly be described in detail.

Second Embodiment

Figure 10:
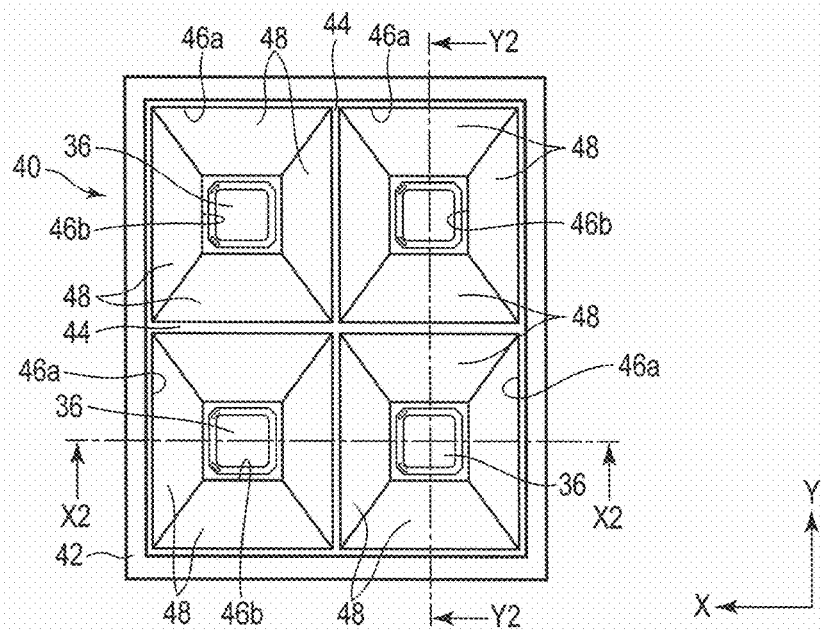
FIG. 10 is a plan view showing a reflector and a light source unit in a display device according to a second embodiment.

FIG. 10 is a plan view showing a reflector and a light source unit in a display device according to the second embodiment, FIG. 11 is a cross-sectional view of the reflector and the light source unit taken along line X2-X2 in FIG. 10, and FIG. 12 is a cross-sectional view of the reflector and the light source unit taken along line Y2-Y2 in FIG. 10.

As shown in FIG. 10 to FIG. 12, according to the Second Embodiment, a reflector 40 of the liquid crystal display device comprises a plurality of rectangular emission openings 46a provided on an emission surface, a plurality of rectangular emission openings 46a provided on an incidence surface, and a plurality of reflective surfaces 48 formed on surfaces of side walls 44 and inner surfaces of an outer wall 42. Four reflective surfaces 48 are formed for each of the emission openings 46a. Each of the reflective surfaces 48 extends from a side of the incidence opening 46b to a side of the emission opening 46a. Each of the reflective surfaces 48 is formed of a surface obtained by combining a plurality of curved surfaces. In the present embodiment, each of the reflective surfaces 48 includes a first curved surface 48a extending from a side of the incidence opening 46b to a middle part of the height direction of the reflector 40, and a second curved surface 48b extending from a middle part to a side of the emission opening 46a. The first curved surface 48a is, for example, a curved surface which is concave to a central axis Z1 passing through the center of the emission opening 46a or an optical axis C1 of the LED 36, and the second curved surface 48b is a curved surface which is concave to the central axis Z1 or the optical axis C1.

As shown in FIG. 11 and FIG. 12, two reflective surfaces 48 opposed to each other in the X-axis direction and two reflective surfaces 48 opposed to each other in the Y-axis direction have different curvatures of the curved surfaces, in the present embodiment. For example, on two reflective surfaces 48 opposed to each other in the X-axis direction, the first curved surface 48a and the second curved surface 48b have radius of curvature R1 and radius of curvature R2, respectively, and R1 is smaller than or equal to R2 (R1≤R2). On two reflective surfaces 48 opposed to each other in the Y-axis direction, the first curved surface 48a and the second curved surface 48b have radius of curvature R3 and radius of curvature R4, respectively, R3 is smaller than or equal to R4, and R3 is smaller than or equal to R1 (R3≤R4, R3≤R1).

Each of the radii of curvature R1 to R4 of the first curved surfaces 48a and the second curved surfaces 48b is arbitrarily set in consideration of the reflection efficiency. In other words, the radii of curvature of the first curved surfaces 48a and the second curved surfaces 48b are selected such that the light emitted from the LEDs 36 is reflected to the liquid crystal display panel 12 side with a strong directivity and that the light is emitted uniformly from the overall emission openings 46a.

In the Second Embodiment, the other constituent elements of the backlight device and the liquid crystal display device are the same as those of the above-explained First Embodiment.

Figure 13:
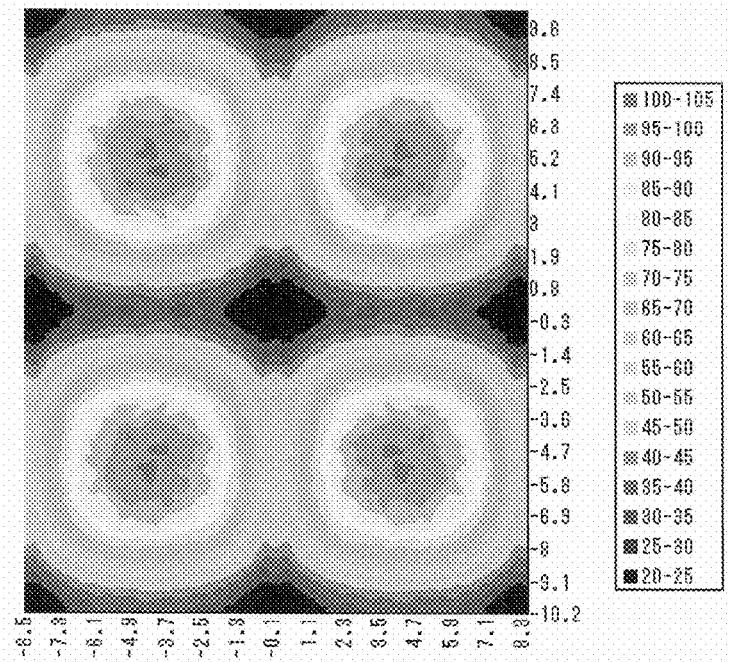
FIG. 13 is a graph showing an example of an emitted light profile of a reflector according to the second embodiment.

According to the Second Embodiment configured as explained above, Lambertian emission emitted from the LEDs 36 which are point sources can be converted into emission profiles in square pyramid shape, by constituting the reflective surfaces 48 connected to each of the emission openings 46a by combination of the first curved surfaces 48a and the second curved surfaces 48b different in radius of curvature and, furthermore, by providing four reflective surfaces 48 connected to four sides of the rectangular emission opening 46a. FIG. 13 shows an example of an emitted light profile of the reflector 40. Moreover, the same advantages as those of the First Embodiment can also be obtained in the Second Embodiment.

Third Embodiment

Figure 14:
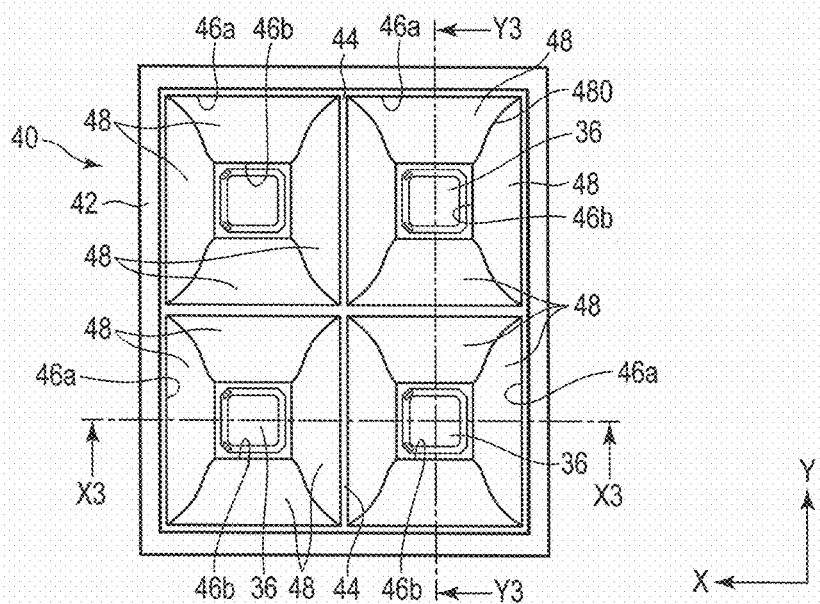
FIG. 14 is a plan view showing a reflector and a light source unit in a display device according to a third embodiment.
Figure 15:
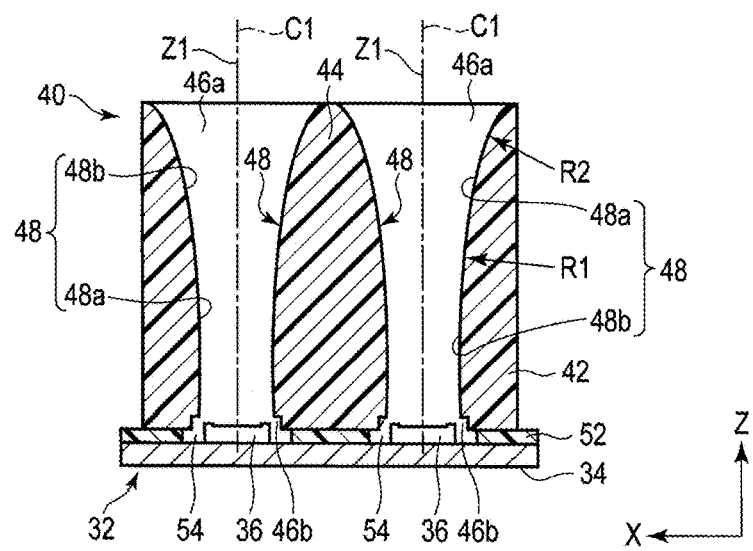
FIG. 15 is a cross-sectional view showing the reflector and the light source unit taken along line X3-X3 in FIG. 14.
Figure 16:
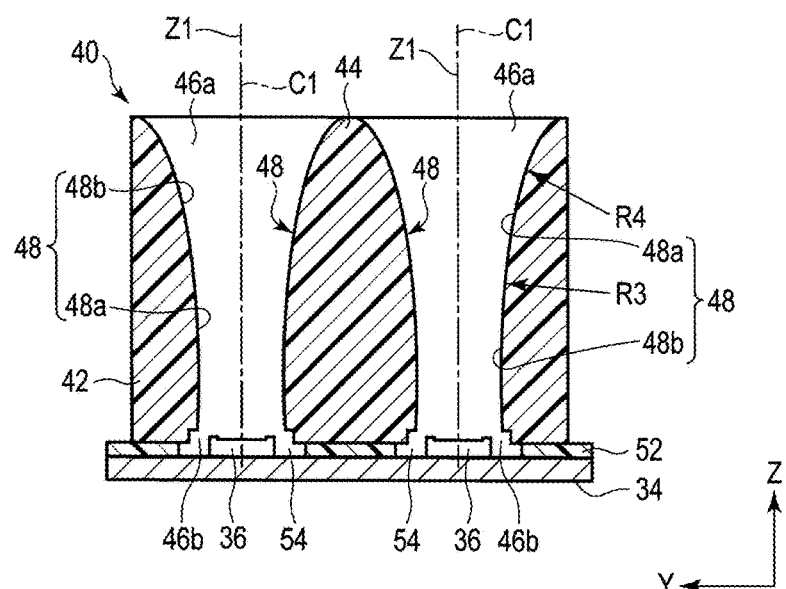
FIG. 16 is a cross-sectional view showing the reflector and the light source unit taken along line Y3-Y3 in FIG. 14.

FIG. 14 is a plan view showing a reflector and a light source unit in a display device according to the third embodiment, FIG. 15 is a cross-sectional view of the reflector and the light source unit taken along line X3-X3 in FIG. 14, and FIG. 16 is a cross-sectional view of the reflector and the light source unit taken along line Y3-Y3 in FIG. 14.

As shown in FIG. 14 to FIG. 16, according to the third embodiment, four reflective surfaces 48 of a reflector 40 are provided for each of the emission openings 46a. Each of the reflective surfaces 48 extends from a side of the incidence opening 46b to a side of the emission opening 46a. Each of the reflective surfaces 48 is formed of a surface obtained by combining a plurality of curved surfaces. In the present embodiment, each of the reflective surfaces 48 includes a first curved surface 48a extending from a side of the incidence opening 46b to a middle part of the height direction of the reflector 40, and a second curved surface 48b extending from the middle part to a side of the emission opening 46a. The first curved surface 48a is a curved surface which is convex to a central axis Z1 of the emission opening 46a or an optical axis C1 of the LED 36, and the second curved surface 48b is a curved surface which is convex to the central axis Z1 or the optical axis C1.

As shown in FIG. 15 and FIG. 16, two reflective surfaces 48 opposed to each other in the X-axis direction and two reflective surfaces 48 opposed to each other in the Y-axis direction have different curvatures of the curved surfaces. For example, on two reflective surfaces 48 opposed to each other in the X-axis direction, the first curved surface 48a and the second curved surface 48b have radius of curvature R1 and radius of curvature R2, respectively, and R1 is larger than or equal to R2 (R1≥R2). On two reflective surfaces 48 opposed to each other in the Y-axis direction, the first curved surface 48a and the second curved surface 48b have radius of curvature R3 and radius of curvature R4, respectively, R3 is larger than or equal to R4, and R3 is smaller than or equal to R1 (R3≥R4, R3≤R1).

The radii of curvature R1 to R4 of the first curved surfaces 48a and the second curved surfaces 48b are selected such that the light emitted from the LEDs 36 is reflected to the liquid crystal display panel 12 side with a strong directivity and that the light is emitted uniformly from the overall emission openings 46a.

In the third embodiment, the other constituent elements of the backlight device and the liquid crystal display device are the same as those of the above-explained first embodiment.

According to the third embodiment configured as explained above, Lambertian emission emitted from the LEDs 36 which are point sources can be converted into emission profiles in square pyramid shape, by constituting the reflective surfaces 48 connected to each of the emission openings 46a by combination of the first curved surfaces 48a and the second curved surfaces 48b different in radius of curvature and, furthermore, by providing four reflective surfaces 48 connected to four sides of the rectangular emission opening 46a. FIG. 17 shows an example of an emitted light profile of the reflector 40. Moreover, the same advantages as those of the first embodiment can also be obtained in the third embodiment.

According to the third embodiment, since the first curved surfaces 48a have the radii of curvature R2 and R4 and the second curved surfaces 48b have the radii of curvature R1 and R3, a boundary 480 connecting the curved surfaces different in radius of curvature becomes a curve as shown in FIG. 14.

In the second and third embodiments, the recess portions may be formed at four corner portions of each of the emission openings 46a, similarly to the above-explained first embodiment.

Fourth Embodiment

Figure 19:
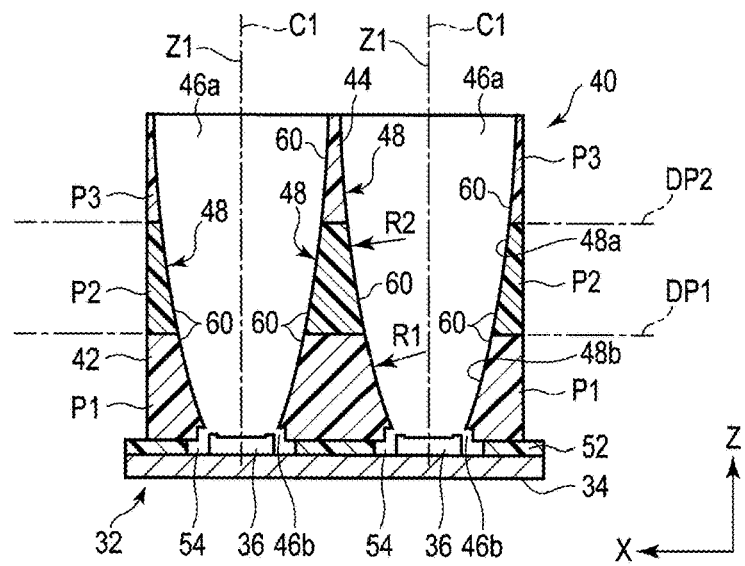
FIG. 19 is a cross-sectional view of the reflector and the light source unit taken along line X4-X4 in FIG. 18.
Figure 20:
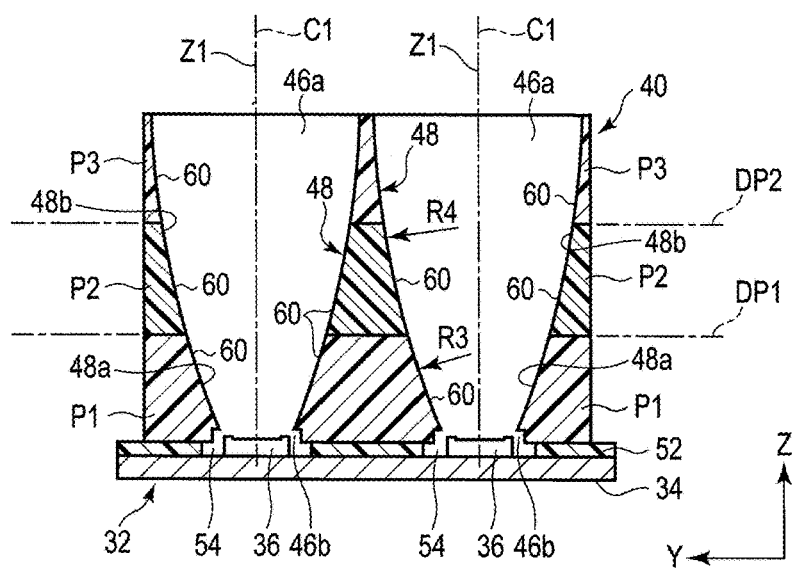
FIG. 20 is a cross-sectional view of the reflector and the light source unit taken along line Y4-Y4 in FIG. 18.

FIG. 18 is a plan view showing a reflector and a light source unit in a display device according to the fourth embodiment, FIG. 19 is a cross-sectional view of the reflector and the light source unit taken along line X4-X4 in FIG. 18, and FIG. 20 is a cross-sectional view of the reflector and the light source unit taken along line Y4-Y4 in FIG. 18.

The directivity of the reflector of the backlight device increases as the reflector becomes higher (i.e., as the distance of passage of light becomes longer). In addition, the reflectance is increased by evaporating a metal film of aluminum or the like onto the inner walls, i.e., the reflective surfaces of the reflector. Furthermore, if the height (depth) of the reflector increases, a uniform metal film can hardly be formed on the reflective surface.

Thus, in the present embodiment, the reflector 40 is constituted by dividing the reflector 40 into a plurality of blocks in the height direction (i.e., axial direction of the central axis Z1), forming the evaporated film on the inner wall of each of the divisional blocks, and integrally bonding the divisional blocks to each other.

More specifically, as shown in FIG. 18 to FIG. 20, the reflector 40 of the backlight device comprises a plurality of rectangular emission openings 46a provided on an emission surface, a plurality of rectangular emission openings 46a provided on an incidence surface, and a plurality of reflective surfaces 48 formed on surfaces of side walls 44 and inner surfaces of an outer wall 42. Four reflective surfaces 48 are formed for each of the emission openings 46a. Each of the reflective surfaces 48 extends from a side of the incidence opening 46b to a side of the emission opening 46a. Each of the reflective surfaces 48 is formed of a surface obtained by combining a plurality of curved surfaces. In the present embodiment, each of the reflective surfaces 48 includes a first curved surface 48a extending from a side of the incidence opening 46b to a middle part of the height direction of the reflector 40, and a second curved surface 48b extending from the middle part to a side of the emission opening 46a. The first curved surface 48a is, for example, a curved surface which is concave to a central axis Z1 passing through the center of the emission opening 46a or an optical axis C1 of the LED 36, and the second curved surface 48b is a curved surface which is concave to the central axis Z1 or the optical axis C1.

As shown in FIG. 19 and FIG. 20, two reflective surfaces 48 opposed to each other in the X-axis direction and two reflective surfaces 48 opposed to each other in the Y-axis direction have different curvatures of the curved surfaces, in the present embodiment. For example, on two reflective surfaces 48 opposed to each other in the X-axis direction, the first curved surface 48a and the second curved surface 48b have radius of curvature R1 and radius of curvature R2, respectively, and R1 is smaller than or equal to R2 (R1≤R2). On two reflective surfaces 48 opposed to each other in the Y-axis direction, the first curved surface 48a and the second curved surface 48b have radius of curvature R3 and radius of curvature R4, respectively, R3 is smaller than or equal to R4, and R3 is smaller than or equal to R1 (R3≤R4, R3≤R1).

Each of the radii of curvature R1 to R4 of the first curved surfaces 48a and the second curved surfaces 48b is arbitrarily set in consideration of the reflection efficiency. In other words, the radii of curvature of the first curved surfaces 48*a* and the second curved surfaces 48*b* are selected such that the light emitted from the LEDs 36 is reflected to the liquid crystal display panel 12 side with a strong directivity and that the light is emitted uniformly from the overall emission openings 46*a*.

According to the present embodiment, as shown in FIG. 18 to FIG. 20, the reflector 40 comprises a plurality of, for example, three divided blocks, i.e., first divisional block P1, second divisional block P2, and third divisional block P3 in the height direction (i.e., axial direction of the central axis Z1). Divisional surfaces are two divisional planes DP1 and DP2 each intersecting or, for example, orthogonal to the central axis Z1. Each of the divisional planes DP1 and DP2 crosses the reflective surfaces 48. The first divisional block P1, the second divisional block P2, and the third divisional block P3 are formed of a common material such as white resin or materials different from each other. Evaporated films (reflective films) 60 are formed on respective inner surfaces of the first divisional block P1, second divisional block P2, and third divisional block P3 forming the reflective surface 48. The first divisional block P1, the second divisional block P2, and the third divisional block P3 are deposited in order and bonded to each other, and the integral reflector 40 is thereby formed.

Evaporation materials (reflectances) of the evaporated films 60 may be changed for each divisional block. For example, the reflectance of the evaporated film 60 of the first divisional block P1 may be A, the reflectance of the evaporated film 60 of the second divisional block P2 may be B, and the reflectance of the evaporated film 60 of the third divisional block P3 may be C (A>B>C). In other words, the reflectances of the reflective surfaces 48 may be gradually reduced from the light source (LED 36) side toward the emission openings 46*a*.

In addition, the thickness of the evaporated films 60 may be varied for each divisional block. For example, the thickness of the evaporated film 60 of the first divisional block P1 may be AH, the thickness of the evaporated film 60 of the second divisional block P2 may be BH, and the thickness of the evaporated film 60 of the third divisional block P3 may be CH, such that AH<BH<CH. Since the thickness of the divisional blocks has the relationship P1>P2>P3, light leakage from the divisional blocks to the adjacent divisional blocks can be prevented by setting the thickness of the evaporated films 60 to have the relationship AH<BH<CH.

The formation materials may be changed for each divisional block. For example, the first divisional block P1 may be formed of black resin, the second divisional block P2 may be formed of white resin, and the third divisional block P3 may be formed of transparent resin. Thus, the light leakage to the adjacent divisional blocks can be prevented by forming the divisional blocks close to the light sources (LEDs 36) of materials of deeper colors. In addition, the first divisional block P1, the second divisional block P2, and the third divisional block P3 do not need to formed of synthetic resin but may be formed of, for example, different materials such as aluminum, silver, and silicon nitride. Furthermore, an evaporated film may be formed on the outer surface (top surface) of the reflector 40. In this case, heat radiation of the reflector can be improved.

The same advantages as those of the First Embodiment can be obtained from the Fourth Embodiment configured as explained above. Furthermore, according to the present embodiment, since the reflector is formed by bonding a plurality of divisional blocks, the evaporated films can easily be formed on the reflective surfaces even if the height of the reflector is increased. The evaporated films of the uniform thickness can be formed on the divisional blocks and the stable reflection property can be obtained. Alternatively, the reflectance, thickness, and the like of the reflective surfaces can be varied for each divisional block, and the reflection property of the reflector 40 can easily be adjusted.

FIG. 21 and FIG. 22 shows a structural example in which the reflector 40 having the first curved surfaces 48*a* and the second curved surfaces 48*b* different in curvature of the curved surfaces is divided into three blocks, on the reflective surfaces 48 shown in FIG. 4 to FIG. 6. Similarly to FIG. 18 to FIG. 20, the reflector 40 comprises a plurality of, for example, three divided blocks, i.e., first divisional block P1, second divisional block P2, and third divisional block P3 in the height direction (i.e., axial direction of the central axis Z1). Divisional surfaces are two divisional planes DP1 and DP2 each intersecting or, for example, orthogonal to the central axis Z1. Each of the divisional planes DP1 and DP2 crosses the reflective surfaces 48. The first divisional block P1, the second divisional block P2, and the third divisional block P3 are formed of a common material such as white resin or materials different from each other. Evaporated films (reflective films) 60 are formed on respective inner surfaces of the first divisional block P1, second divisional block P2, and third divisional block P3 forming the reflective films 48. The first divisional block P1, the second divisional block P2, and the third divisional block P3 are deposited in order and bonded to each other, and the integral reflector 40 is thereby formed.

In the reflector 40 shown in FIG. 21 and FIG. 22, a supporter 610 is formed on the first divisional block P1. When the first divisional block P1 is divided by the divisional plane DP1, the first divisional block P1 can be prevented from being separated to pieces since the first divisional block P1 is supported by a support 610 in the X-Y direction.

In the above-explained Fourth Embodiment and the structural example shown in FIG. 21 and FIG. 22, the reflector 40 is divided into three blocks and is not limited to those, but may be divided into two or four or more blocks. Since the curvature is divided into two parts at the boundary between the first curved surface 48*a* and the second curved surface 48*b* of the reflector 40 shown in FIG. 21 and FIG. 22, the reflector 40 can also be divided into two parts at the boundary between the first curved surface 48*a* and the second curved surface 48*b*.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

All of the structures which can be implemented by a person of ordinary skill in the art through arbitrary design changes to the structures described above as embodiments of the present invention come within the scope of the present invention as long as they are in keeping with the spirit of the present invention. For example, the shape of the liquid crystal display panel and the constituent members of the backlight device are not limited to the rectangular shape, but may be the other shape such as a polygon having five or more angles, an ellipse or a track shape. The materials and sizes of the constituent members are not limited to the above-explained examples but can be variously selected.

Other advantages which can be obtained by the above embodiments and are self-evident from the description in this specification or can be arbitrarily conceived by a person of ordinary skill in the art are considered to be achievable by the present invention as a matter of course.

What is claimed is:

1. A projection system comprising:
a light source module;
a reflector; and
a display panel;
wherein
the reflector includes a plurality of incidence openings, and a plurality of emission openings,
light from the light source module is made incident onto the plurality of incidence openings and goes through from the plurality of incidence openings to the plurality of emission openings,
the light from the plurality of emission openings illuminate the display panel,
brightness of the light from each one of the plurality of emission openings is controlled independently,
the plurality of incidence openings includes a first incidence opening, and a second incidence opening which is adjacent to the first incidence opening,
the plurality of emission openings includes a first emission opening, and a second emission opening which is adjacent to the first emission opening,
the first emission opening and the second emission opening are partitioned by a common wall, and
the first emission opening and the second emission opening are partitioned by two walls individually which are distanced by a space.

2. The projection system of claim 1, wherein
the plurality of incidence openings have a reflective surface, and
the plurality of emission openings have a reflective surface.

3. The projection system of claim 2, wherein
reflectance of a surface of the plurality of incidence openings is different from that of the plurality of emission openings.

4. The projection system of claim 3, wherein
reflectance of the surface of the plurality of emission openings is higher than that of the plurality of emission openings.

5. The projection system of claim 3, wherein
a reflective film is formed on the surface of the plurality of emission openings.

6. The projection system of claim 1, wherein
a surface of the plurality of emission openings and a surface of the plurality of emission openings are formed of materials different from each other.

7. The projection system of claim 2, wherein
the light source module includes a plurality of light sources, and
the reflector includes an inner surface between each of the plurality of incidence openings and the plurality of emission openings,
the inner surface is formed by combining a plurality of curved surfaces arranged in optical axis directions of the light sources.

8. The projection system of claim 7, wherein
each of the plurality of incidence openings has a rectangular shape with four sides, and each of the plurality of emission openings has a rectangular shape with four sides.

9. The projection system of claim 7, wherein
each of the inner surfaces includes a first curved surface which is concave to an optical axis of one of the light sources and a second curved surface which is concave to the optical axis of the light source.

10. The projection system of claim 7, wherein
each of the inner surfaces includes a first curved surface which is convex to an optical axis of one of the light sources and a second curved surface which is concave to the optical axis of the light source.

11. The projection system of claim 7, wherein
each of the inner surfaces includes a first curved surface which is convex to an optical axis of one of the light sources and a second curved surface which is convex to the optical axis of the light source.

12. A projection system comprising:
a light source module;
a reflector; and
a display panel;
wherein
the reflector includes a plurality of incidence openings, and a plurality of emission openings,
light from the light source module is made incident onto the plurality of incidence openings and goes through from the plurality of incidence openings to the plurality of emission openings,
the light from the plurality of emission openings illuminate the display panel,
brightness of the light from each one of the plurality of emission openings is controlled independently,
the plurality of incidence openings include a first incidence opening, and a second incidence opening which is adjacent to the first incidence opening,
the plurality of emission openings include a first emission opening, and a second emission opening which is adjacent to the first emission opening,
the first emission opening and the second emission opening are partitioned by a first wall which is common wall of the first incidence opening and the second incidence opening,
the first emission opening and the second emission opening are partitioned by two second walls individually which are distanced by a space,
the first wall and the second wall are bonded to each other.

13. The projection system of claim 12, wherein
the first wall has a reflective surface, and
the second wall has a reflective surface.

14. The projection system of claim 13, wherein
reflectance of the first wall is different from reflectance of the second wall.

15. The projection system of claim 14, wherein
reflectance of the reflective surface of the first wall is higher than that of the reflective surface of the second wall.

16. The projection system of claim 14, wherein
a reflective film is formed on a surface of the first wall.

17. The projection system of claim 12, wherein
the first wall and the second wall are formed of materials different from each other.

18. The projection system of claim 13, wherein
the light source module comprises a plurality of light sources, and the reflective surfaces of the first wall and the second wall is formed by combining a plurality of curved surfaces arranged in optical axis directions of the light sources.

19. The projection system of claim 12, wherein
each of the incidence openings has a rectangular shape with four sides, and each of the emission openings has a rectangular shape with four sides.

20. The projection system of claim 13, wherein
the reflective surface of the first wall includes a first curved surface which is concave to an optical axis of one of the light sources, and
the reflective surface of the second wall includes a second curved surface which is convex to the optical axis of the light source.

\* \* \* \* \*